2,897,182

OXAZINE AND OXAZOLINE POLYMERS

Peter L. de Benneville and Leo S. Luskin, Philadelphia, Pa., assignors to Rohm & Haas Company, Philadelphia, Pa., a corporation of Delaware No Drawing. Application September 6, 1957
Serial No. 682,286

10 Claims. (Cl. 260—85.5)

This invention relates to polymers of 2-oxazolines and 5,6-dihydro-4H-1,3-oxazines. More particularly this invention concerns homopolymers and copolymers of 4,4-dialkyl-2-vinyl, 4,4-dialkyl-2-isopropenyl substituted oxazolines, and identically substituted 5,6-dihydro-4H-1,3-oxazines. This application is a continuation-in-part of our United States patent application Serial No. 584,173, filed May 11, 1956, now United States Patent 2,831,858, and covering the monomers from which the instant homopolymer and copolymers are derived, and to a method for preparing the monomers.

This invention also concerns homopolymers and copolymers of the 2-isopropenyl and 2-vinyl spirans formed when the 2-isopropenyl, 2-vinyl substituted oxazolines, and identically substituted 5,6-dihydro-4H-1,3-oxazines are joined, through a common, i.e., spiro carbon atom, namely the 4-carbon of the oxazoline or of the 5,6-dihydro-4H-1,3-oxazine heterocycle, to a divalent saturated aliphatic hydrocarbon group.

The monomers have the following formula:

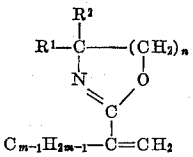

in which $(CH_2)_n$ is an alkylene group of one to two carbon atoms, $R^1$ and $R^2$, when taken individually, are alkyl radicals, one being methyl and the other containing not more than eight carbon atoms or $R^1$ and $R^2$, when taken together, form a divalent saturated aliphatic hydrocarbon group containing four to nine carbon atoms, which together with the carbon to which $R^1$ and $R^2$ are bonded forms a five- to six-sided carbocycle, $m$ is an integer from one to two inclusive, and $n$ is an integer from one to two inclusive.

The 4,4-dialkyl-2-vinyl and the 4,4-dialkyl-2-isopropenyl substituted oxazolines and identically substituted 5,6-dihydro-4H-1,3-oxazines and the spirans thereof are made by reacting under conditions which are discussed in detail further below, aminoalcohols or alkanolamines having the formula

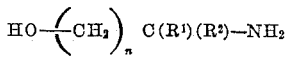

in which $n$, $R^1$, and $R^2$ are defined above, with acryloyloxyalkanes or methacryloyloxyalkanes, that is lower alkyl esters of acrylic and methacrylic acid, having the formula $$CH_2=C(C_{m-1}H_{2m-1})COOR^3$$

in which $R^3$ is an alkyl radical containing from one to four carbon atoms, in the presence of a polymerization inhibitor and of a metal alkoxide of the formula $M(OR^4)_x$, in which M is a metal selected from the group of the metals of atomic number from 13 to 40 from groups III–A and IV–B of the periodic table, $x$ has the same numerical value as the valency of the metal M, and $R^4$ is an alkyl radical preferably of not over five carbon atoms.

Normally, the reaction of acrylic or methacrylic esters with primary aminoalcohols results in a complicated series of side reactions which apparently involve, especially at high temperatures, a preferential formation of the alkylhydroxyalkyl amide of the unsaturated ester. In the presence of an alkaline catalyst, such as sodium methoxide, there usually occurs addition of the amine across the double bond of the unsaturated ester. This is the general course of reaction with ethanolamine, propanolamine, and other similar primary amines. For instance, when propanolamine is reacted with ethyl acrylate, there is obtained ethyl β-(hydroxypropylamino)-propionate. Often, in the absence of a polymerization inhibitor, the reaction is further complicated by the formation of a reaction mixture containing considerable polymeric material. In an isolated case, a primary amino higher alcohol has been observed to form an aminoalkyl ester when that higher alcohol is reacted, under special conditions, with an ester of acrylic or methacrylic acid. Neither in the reaction of the unsaturated esters with conventional aminoalcohols nor with the amine of a long-chained alcohol substituent can there be isolated heterocyclic compounds with an intact isopropenyl or vinyl substituent.

It is, therefore, very surprising, in view of the knowledge of these reactions, to find that when an acrylic or methacrylic ester is reacted under specific conditions with a special alkanolamine, we are able to obtain 2-vinyl or 2-isopropenyl substituted heterocyclic compounds, more specifically such substituted oxazolines and 5,6-dihydro-4H-1,3-oxazines and the spirans thereof.

We have found that the reaction appears to require aminoalcohols in which, to the carbon atom adjacent to the amino group, there are bonded two alkyl radicals. Preferably, to the tertiary carbon atom, onto which the amino group is bonded, there is bonded a methyl radical, while the other alkyl radical bonded to the tertiary carbon preferably is limited to eight carbon atoms. Alternatively, the tertiary carbon atom is part of a cycloalkyl radical preferably containing five to ten carbon atoms. While these somewhat unconventional aminoalcohols may have a higher alkyl substituent on the tertiary carbon, to be operative, these aminoalcohols are limited to those having a lower alcohol, $HO-(CH_2)_n-$ ($n$ being as defined above), on the tertiary carbon, onto which the alkyl and amino radicals also are bonded.

These aminoalcohols can conveniently be prepared by methods known in the art, such as by the method of Blomquist and Verdol, J. Am. Chem. Soc. 77, 78 (1955); Wheatley, J. Am. Chem. Soc. 76, 2833 (1954); Brown and Van Gulick, J. Am. Chem. Soc. 77, 1079 (1955); and Newman and Edwards, J. Am. Chem. Soc. 76, 1840 (1954). These methods and known others can readily be applied to the preparation of the desired aminoalcohol.

Typical alkanolamines which advantageously can be used to react with the esters of acrylic or methacrylic acid and which are represented by the above general formula are:

3-amino-3-methyl-1-octanol,
3-amino-3-methyl-1-heptanol,
3-amino-3-methyl-1-hexanol,
3-amino-3-methyl-1-pentanol,
3-amino-3-methyl-1-butanol,
3-amino-3-methyl-1-isohexanol,
3-amino-3-methyl-4-isopropyl-1-heptanol,
3-amino-3-methyl-5,6-diethyl-1-octanol,
3-amino-3-methyl-4-ethyl-5-methyl-1-octanol,
3-amino-3,4-dimethyl-1-pentanol, 3-amino-3-methyl-1-hendecanol,
3-amino-3-methyl-1-decanol,
3-amino-3-methyl-1-nonanol,
3-amino-3-methyl-4-ethyl-1-nonanol,
3-amino-3,4-dimethyl-1-heptanol,
3-amino-3,4,5-trimethyl-1-nonanol,
2-amino-2-methyl-1-decanol,
2-amino-2-methyl-1-nonanol,
2-amino-2-methyl-1-octanol,
2-amino-2-methyl-1-hexanol,
2-amino-2-methyl-1-pentanol,
2-amino-2-methyl-1-butanol,
2-amino-2-methyl-1-propanol,
2-amino-2-methyl-1-isohexanol,
2-amino-2,3,4-trimethyl-1-octanol,
2-amino-2,2-methyl-3,4-diethyl-1-hexanol,
2-amino-2,3-dimethyl-1-pentanol,
2-amino-2,3-dimethyl-1-butanol,
1-amino-1-(α-hydroxymethyl)cyclohexane,
1-amino-1-(α-hydroxymethyl)cyclopentane,
1-amino-1-(β-hydroxyethyl)cyclohexane,
1-amino-3,5-dimethyl-1-(β-hydroxyethyl)cyclohexane,
1-amino-3,5-dimethyl-1-(α-hydroxymethyl)cyclohexane,
1-amino-2,2-dimethyl-1-(α-hydroxymethyl)cyclopentane,
1-amino-2,2-dimethyl-1-(β-hydroxyethyl)cyclopentane,
1-amino-2,3-dimethyl-5-ethyl - 1 - (β-hydroxyethyl)cyclohexane,
1-amino-2,3-dimethyl-5-ethyl-1 - (α-hydroxymethyl)cyclohexane,
1-amino-2,3-dimethyl-5-ethyl-1 - (α-hydroxymethyl)cyclopentane, and
1-amino-2,3-dimethyl-5-ethyl - 1 - (β-hydroxyethyl)cyclopentane.

It is to be noted that apparently the more common alkali metal alkoxides are inoperative in this process since it seems that, if they are substituted for the special catalysts required herein, the resulting mixtures are undesirable amides. We have found that the reaction of the alkanolamines with the esters of acrylic or methacrylic acid is desirably promoted by the presence of a metal alkoxide of the general formula $M(OR^4)_x$, in which M is a metal selected from the metals of atomic number from 13 to 40 inclusive, selected from groups III-A and IV-B of the periodic table, $x$ is an integer having the same numerical value as the valence of the metal and ranges from three to four inclusive, and $R^4$ preferably is a lower alkyl group of one to five carbon atoms. Higher alkoxides are also effective, the preference for lower alkyl is merely for convenience and availability reasons. Typical organo metal alkoxide catalysts include aluminum butoxide, aluminum isopropoxide, aluminum ethoxide, aluminum propoxide, aluminum methoxide, aluminum octoxide, aluminum hexoxide, tetra-n-butyl titanate, tetraisopropyl titanate, tetra-n-hexyl titanate, zirconium tetraisopropoxide, and the alkoxides of gallium. The catalysts should be used in an amount from about 0.1 to about 25%, preferably from about 5 to 20% by weight of the alkanolamine used. Aluminum alkoxides, especially aluminum isopropoxide, and tetraisopropyl titanate, in an amount from about 5 to about 20% by weight of the alkanolamine, are very efficient catalysts.

As acryloyloxyalkanes or methacryloyloxyalkanes, which are reacted in the presence of the metal alkoxide catalyst, there may be used such typical acrylic esters as methyl acrylate, ethyl acrylate, isopropyl acrylate, n-butyl acrylate, methyl methacrylate, ethyl methacrylate, n-butyl methacrylate, isobutyl methacrylate, isopropyl methacrylate, tert-butyl methacrylate, tert-butyl acrylate, hexyl methacrylate, and 2-ethylhexyl acrylate.

In reacting the acryloyloxyalkanes or the methacryloyloxyalkanes with the alkanolamines, there should be taken at least about 1.5 moles of the ester and there may be used as much as four moles per mole of alkanolamine. Commonly there are used two moles or more of the ester for each mole of alkanolamine to insure high yields of the oxazolines and the 4H-1,3-oxazines. A ratio of 2:1 (ester:alkanolamine) is favored since it is efficient and economical. The excess of ester of about two moles or more is helpful in insuring complete and efficient reaction of the amine and is therefore favored. The excess of ester also is helpful in order to follow the progress of the reaction, since, as the reaction approaches the end, the temperature at the head of the fractionating column approaches the boiling point of the unsaturated ester. The unreacted ester serves also as a solvent, and it is easily removed from the product as, for example, by distillation.

In the reaction of the acrylic or methacrylic ester, there should also be present a polymerization inhibitor to prevent the formation of insoluble polymeric products. It is, therefore, desirable to use esters containing such an inhibitor or to add polymerization inhibitors like di-β-naphthol, hydroquinone, p-hydroxydiphenylamine, N,N'-diphenylphenylenediamine, 2,5-di-tert-butylhydroquinone, trinitrotoluene, copper carbonate, or methylene blue. These have been found particularly effective for this purpose and other similar inhibitors are well known in the art. The inhibitor should be used in an amount from about 0.1 to about 10%, preferably from about 0.5 to about 5% by weight based on the acrylic or methacrylic ester.

The effectiveness of the organometallic catalyst being somewhat increased when water is substantially removed from the initial reactants, it is preferable, though not necessary, to start with substantially anhydrous reactants. Any conventional method of the art is well suited for drying the starting materials, and this may also be performed in one operation as part of the steps of this process by first heating the mixture of the ester and the alkanolamine to the temperature at which water distills off, this being at a temperature from about 80° C. to about the boiling point of the ester. As the water is liberated, the ester is returned to the reaction mixture. Then the temperature is lowered and the organometallic catalyst is then added and heating is continued. This may be done in any appropriate equipment, such as in a flask equipped with a short packed column with an adjustable total reflux stillhead. Customarily, the overhead temperature is carefully maintained as close as possible to the boiling point of the alcohol-unsaturated ester azeotrope. The azeotropic mixture of the alcohol and acrylic or methacrylic ester has a boiling point which depends on the alkyl substituent of the ester since the alkanol $R^3OH$ which distills off during the reaction is made up from that substituent. For example, the boiling points in degrees centigrade at 760 mm. pressure, of the ester and of the azeotropic mixtures of some purified acrylates and methacrylates with their corresponding alkanols, are shown below:

| Ester | Boiling point | Azeotropes | Boiling point |
| --- | --- | --- | --- |
| Methyl acrylate | 80.3 | Methanol+methyl acrylate | 62 |
| Ethyl acrylate | 99.7 | Ethanol+ethyl acrylate | 72.5 |
| Methyl methacrylate | 100.6 | Methanol+methyl methacrylate. | 64.2 |

The boiling point of the azeotropic mixture, close to which the temperature at the head of the fractionating is preferably maintained, is below the boiling point of the unsaturated acrylic or methacrylic ester. It is, therefore, recommended that the temperature at the head of the distillation column preferably be maintained within the range from about the boiling point of the azeotropic mixture of the ester and the alkanol which is formed therefrom and the boiling point of the ester and preferably as close as possible to the former temperature. For example, for methyl methacrylate and the azeotrope formed with methyl methacrylate and methanol, that temperature range is from about 64.2° C. to about 100° C. at 760 mm. pressure, and the preferred range is from about 64° to 84° C. However, a temperature of about 62° C. may very conveniently be used too when methyl acrylate is the unsaturated ester. Although heating to about at least the boiling point of the azeotropic mixture is essential for successful production of oxazolines and 5,6-dihydro-4H-1,3-oxazines, the temperature at the head of the column may go up as high as about 163° C. at normal pressure when the unsaturated ester is n-butyl methacrylate and correspondingly higher or lower according to the particular unsaturated ester used.

The temperature in the pot is carefully controlled to prevent polymerization of the product. Although temperature at about 100° C. is operative, preferably, the pot temperature is maintained between about 110° and about 130° C., by operating under reduced pressure, if necessary, to avoid undue heating. In this manner, resulting correspondingly lower pot and head temperatures are obtained. For instance, 400 mm. can be conveniently used and under reduced pressure temperatures at the overhead of about 47°–64° C. are found to be very effective.

It is to be noted that we are successful in preparing the 2-vinyl and 2-isopropenyl-substituted oxazolines and the identically substituted 5,6-dihydro-4H-1,3-oxazines and the spirans formed therefrom, at reacting temperatures substantially below those commonly used to prepare know oxazolines.

The progress of the reaction can conveniently be followed by measuring the amount of alkanol of reaction which distills off and by following the rise of the temperature since at the end of the reaction the temperature approaches the boiling point of the acrylic or methacrylic ester. Thereafter any excess ester is removed preferably by distillation, leaving the oxazoline or the 5,6-dihydro-4H-1,3-oxazine product, which subsequently can be purified by such conventional methods as extracting or distilling, for example, under reduced pressure.

It is to be noted that in the process of this invention the substituents represented by $R^1$ and $R^2$ remain intact and appear in the final 5,6-dihydro-4H-1,3-oxazines and oxazolines in the some position as they do in the respective starting reactants.

Typical monomers which are made by this process are:

2-isopropenyl-4,4-dimethyloxazoline,
2-isopropenyl-4-methyl-4-ethyloxazoline,
2-isopropenyl-4-methyl-4-propyloxazoline,
2-isopropenyl-4-methyl-4-butyloxazoline,
2-isopropenyl-4-methyl-4-hexyloxazoline,
2-isopropenyl-4-methyl-4-octyloxazoline,
2-isopropenyl-4-methyl-4-(2'-ethyl)hexyloxazoline,
2-isopropenyl-4-methyl-4-(2',3'-dimethyl)butyloxazoline,
2-vinyl-4,4-dimethyloxazoline,
2-vinyl-4-methyl-4-ethyloxazoline,
2-vinyl-4-methyl-4-propyloxazoline,
2-vinyl-4-methyl-4-butyloxazoline,
2-vinyl-4-methyl-4-pentyloxazoline,
2-vinyl-4-methyl-4-heptyloxazoline,
2-vinyl-4-methyl-4-octyloxazoline,
2-vinyl-4-methyl-4-(2'-ethyl)hexyloxazoline,
2-isopropenyl-4,4-dimethyl-5,6-dihydro-4H-1,3-oxazine,
2 - isopropenyl - 4 - methyl - 4 - ethyl - 5,6 - dihydro - 4H-1,3-oxazine,
2 - isopropenyl - 4 - methyl - 4 - butyl - 5,6 - dihydro - 4H-1,3-oxazine,
2 - isopropenyl - 4 - methyl - 4 - isobutyl - 5,6 - dihydro-4H-1,3-oxazine,
2 - isopropenyl - 4 - methyl - 4 - propyl - 5,6 - dihydro-4H-1,3-oxazine,
2 - isopropenyl - 4 - methyl - 4 - isopentyl - 5,6 - dihydro-4H-1,3-oxazine,
2 - isopropenyl - 5 - methyl - 4 - hexyl - 5,6 - dihydro - 4H-1,3-oxazine,
2 - isopropenyl - 4 - methyl - 4 - (2' - ethyl)hexyl - 5,6-dihydro-4H-1,3-oxazine,
2 - isopropenyl - 4 - methyl - 4 - (3' - propyl)pentyl - 5,6-dihydro-4H-1,3-oxazine,
2 - isopropenyl - 4 - methyl - 4 - octyl - 5,6 - dihydro - 4H-1,3-oxazine,
2-vinyl-4,4-dimethyl-5,6-dihydro-4H-1,3-oxazine,
2-vinyl-4-methyl-4-ethyl-5,6-dihydro-4H-1,3-oxazine,
2-vinyl-4-methyl-4-butyl-5,6-dihydro-4H-1,3-oxazine,
2 - vinyl - 4 - methyl - 4 - (3' - ethyl)pentyl - 5,6 - dihydro-4H-1,3-oxazine,
2-vinyl-4-methyl-4-hexyl-5,6-dihydro-4H-1,3-oxazine,
2-vinyl-4-methyl-4-octyl-5,6-dihydro-4H-1,3-oxazine,
2'-isopropenyl-spiro[cyclohexane-1,4'-oxazoline],
2'-vinyl-spiro[cyclohexane-1,4'-oxazoline],
2'-vinyl-spiro[cyclopentane-1,4'-oxazoline],
2,4 - dimethyl - 2' - vinyl - spiro[cyclopentane - 1,4'-oxazoline],
2'-isopropenyl-spiro[cyclopentane-1,4'-oxazoline],
2,2 - dimethyl - 2' - isopropenyl - spiro[cyclopentane - 1,4'-oxazoline],
2,4 - dimethyl - 2' - isopropenyl - spiro[cyclohexane - 1,4'-oxazoline],
2 - ethyl - 3,5 - dimethyl - 2' - isopropenyl - spiro[cyclohexane-1,4'-oxazoline],
2 - ethyl - 3,5 - dimethyl - 2' - vinyl - spiro[cyclohexane-1,4'-oxazoline],
1,2 - dimethyl - 2' - isopropenyl - spiro[cyclopentane-1,4'-oxazoline],
2' - isopropenyl - spiro[cyclohexane - 1,4' - (5',6' - dihydro-4'H-1',3'-oxazine)],
2' - vinyl - spiro[cyclohexane - 1,4' - (5',6' - dihydro - 4'H-1',3'-oxazine)],
2' - vinyl-spiro[cyclopentane - 1,4' - (5',6' - dihydro - 4'H-1',3'-oxazine)],
2' - isopropenyl - spiro[cyclopentane - 1,4' - (5',6' - dihydro-4'H-1',3'-oxazine)],
2,4 - dimethyl - 2' - isopropenyl - spiro[cyclohexane - 1,4'-(5',6'-dihydro-4'H-1',3'-oxazine)],
1,2 - diethyl - 2' - isopropenyl - spiro[cyclohexane - 1,4'-(5',6'-dihydro-4'H-1',3'-oxazine)],
2,4 - dimethyl - 2' - vinyl - spiro[cyclohexane - 1,4'-(5',6'-dihydro-4'H-1',3'-oxazine)].

Since only the hydroxy, the amino, and the carboxy groups react during the process of this invention, the procedure of the examples below illustrating the preparation of some of the compounds of this invention is substantially identical and is followed regardless of the particular hydrocarbon substituent $R^1$, $R^2$, $R^3$, and $R^4$ represent.

In the following illustrative examples, there is shown the preparation of the monomers of this invention. All parts are by weight.

*Example 1*

There are mixed 89 g. (1 mole) of 2-amino-2-methyl propanol, 200 g. (2 moles) of methyl methacrylate, and 10 g. of di-β-naphthol in a reaction vessel equipped with short packed column, an adjustable total reflux stillhead, a stirrer, a thermometer, and a dropping funnel. The mixture is briefly refluxed and there is drained off about 0.5 ml. of water. There is then introduced 2.5 g. of aluminum isopropoxide and the mixture is carefully distilled at high reflux ratio. The overhead temperature is maintained between about 73° and 82° C.; methanol and some methyl methacrylate are taken off as slowly as possible. The pot temperature is maintained between 106° and 114° C. during nine hours of heating. The methanol obtained is 93% of the calculated amount. During nine hours of reaction, 75 ml. of distillate is taken off; the index of refraction at 25° C. is 0.76. The temperature at the top of the fractionating column rises to 93° C. and in the pot to 125° C. The residue in the pot is distilled carefully, preferably in vacuo, removing the excess methyl methacrylate, yielding 2-isopropenyl-4,4-dimethyl-oxazoline. The purified product boils at 58°–59° C./24 mm.; the neutralization equivalent is 142 and it has an index of refraction of 1.453 at 25° C.; nitrogen found 10.0%, theoretical 10.1%. Infra-red examination shows the characteristic two strong peaks at 1658 and 1615 cm.$^{-1}$ assigned to a conjugated system of C=C and C=N bonds, respectively.

Example 2

In the same manner, 3-amino-3-methyl-1-butanol (1 mole), methyl methacrylate (2 moles), and 10 g. of p-hydroxydiphenylamine are reacted in the presence of 2.5 g. of aluminum isopropoxide; methanol distills off. The temperature at the head of the fractionating column approaches 95° C. The final product is 2-isopropenyl-4,4-dimethyl-5,6-dihydro-4H-1,3-oxazine.

Analysis shows the following: boiling point 58°–65° C./13 mm.; index of refraction 1.4558 at 25° C.; neutralization equivalent found 156, theoretical 171; nitrogen found 9.1%, calculated 8.8%; infra-red examination showed the characteristic 2-band system at 1648 and 1618 cm.$^{-1}$.

Example 3

In Example 1, instead of introducing di-β-naphthol, there is substituted 4.5 g. of tetraisopropyl titanate, and the procedure is carried out precisely in the same manner. The final product, 2-isopropenyl-4,4-dimethyloxazoline, is obtained in yields above 60%.

Example 4

The same procedure, as in Examples 1 and 2, is repeated with substitution of tetraisopropyl titanate by amount 1.0 to 5 g. of aluminum propoxide, aluminum ethoxide, aluminum methoxide, or zirconium isopropoxide.

In every case there is isolated 2-isopropenyl-4,4-dimethyloxazoline when the starting material is 2-amino-2-methyl propanol, and there is isolated 2-isopropenyl-4,4-dimethyl-5,6-dihydro-4H-1,3-oxazine when the starting material is 3-amino-3-methyl-1-butanol.

Example 5

A mixture of 89 g. (1 mole) of 2-amino-2-methyl propanol, 172 g. (2 moles) of methyl acrylate, and 15 g. of di-β-naphthol is heated under a 4-inch packed column and total reflux head for one hour. About one ml. of water is collected. Two grams of tetraisopropyl titanate is added, and the distillate, methanol, is collected intermittently at a temperature of about 63° to about 72° C. After four hours, an additional 2.0 g. of tetraisopropyl titanate is added to the reaction through the dropping funnel. Again, after eleven hours, 1.0 g. of catalyst is added. After fifteen hours of heating, the temperature rises to about 77° C. at the overhead and to about 125° C. in the pot.

Total methanol collected is about 81% of calculated amount. The residual liquid is distilled under vacuo, removing excess methyl acrylate and substantially yielding 2-vinyl-4,4-dimethyloxazoline. The purified product boils at 54° C. under 32 mm. pressure; the index of refraction is $n_D^{25}$ 1.435. This product is not quite as pure as that obtained in Example 1, but it is entirely satisfactory for use as a monomer, as a fungicide, or a chemical intermediate.

Example 6

There are mixed 117 g. (1 mole) of 3-amino-3-methyl-1-pentanol, 172 g. of methyl acrylate, and 15 g. of di-β-naphthol to which there is added 5 g. of tetraisopropyl titanate, and, upon following the same procedural steps as in Example 5, there is collected 2-vinyl-4-methyl-4-ethyl-5,6-dihydro-4H-1,3-oxazine.

In Example 6, instead of di-β-naphthol, there is used hydroquinone, trinitrotoluene, or 2,5-di-tert-butylhydroquinone in amounts from 10 to 15 g. which are added to the reaction all at once or intermittently; polymerization is equally well inhibited.

Example 7

There are mixed 159 g. (1 mole) of 2-amino-2-methyl-1-octanol, 200 g. of methyl methacrylate (2 moles), and 15 g. of di-β-naphthol in a reaction vessel with a water separator. The mixture is refluxed to remove any water. There is then introduced about 8 g. of aluminum methoxide; the temperature at the head of the column is maintained between about 65° and 75° C. while methanol is distilled off. The pot temperature is about 120° C. When the temperature reaches about 98° C. at the head, the reaction appears complete; excess methyl methacrylate is distilled off under reduced pressure. The residue is 2-isopropenyl-4-methyl-4-hexyloxazoline which is purified by shaking with saturated calcium chloride solution, extracting with benzene, and evaporation of benzene. Infra-red examination of this product demonstrates the presence of two strong peaks at 1658 and 1615$^{-1}$, assigned to a conjugated system of C=C and C=N bonds respectively.

Example 8

In the same fashion, as in Example 7, 2-amino-2-methyl-1-pentanol and 200 g. of methyl methacrylate are reacted using about 12 g. of aluminum butoxide. The final product obtained is 2-isopropenyl-4-methyl-4-propyloxazoline, the composition being confirmed by analysis.

Example 9

Following the same procedure, 3-amino-3,7-dimethyl-1-octanol (175 g.) is reacted with 172 g. methyl acrylate using a molar ratio of one-half and 14 g. of aluminum methoxide. After ten hours, as the temperature rises to about 79° C., the reaction appears completed; the product is 2-vinyl-4-methyl-4-isohexyl-5,6-dihydro-4H-1,3-oxazine; its composition is confirmed by analysis.

Example 10

In the same manner, one mole of 2-amino-2,3-dimethyl-1-pentanol is reacted with ethyl methacrylate (228 g.) in the presence of tetraisopropyl titanate; the reaction is stopped when, after about 12 hours during which ethanol is taken off, the temperature rises to about 115° C. at the head of the column and the pot temperature reaches 125° C. The residue, principally, is 2-isopropenyl-4-methyl-4-(1'-methyl)propyloxazoline. The same procedure is repeated but the operation is carried out under reduced pressure at 400 mm., thus keeping the pot temperature below 110° C. and obtaining a better yield of 2-vinyl-4-methyl-4-(1'-methyl)propyloxazoline.

Example 11

One mole of 2-amino-2-methyl-1-hexanol and 228 g. of ethyl acrylate are mixed in a reaction vessel with about 12 g. of di-β-naphthol and the mixture is heated with gentle refluxing for one hour. There is collected 2 ml. of water. Tetraisopropyl titanate (10 g.) is added, thus depressing the temperature at the head of the column to within a range of about 78° to 100° C. The preparation is then continued under reduced pressure (350 mm.), thus generally maintaining the temperature below 110° C. at the head and below 125° C. in the pot. One gram portions of tetraisopropyl titanate are added every four hours during the entire period of heating. The distillate, ethanol, is collected. After 16 hours the temperature at the head of the column approaches the boiling point temperature of the ethyl acrylate. The fluid reaction mixture is then distilled under reduced pressure removing excess ethyl acrylate and the product is essentially 2-vinyl-4-methyl-4-butyloxazoline. This compound is useful, for example, as a fungicide. It may be used in polymerization reactions.

Example 12

The same general procedure, as in Example 11, is followed starting with 3-amino-3-methyl-1-hendecanol. The product which is obtained is 2-vinyl-4-methyl-4-octyl-5,6-dihydro-4H-1,3-oxazine, which is particularly useful as an agent for ore classification and for imparting water-repellency to leather.

In Example 11, ethyl acrylate is substituted by isobutyl methacrylate. The operation is carried out under reduced pressure, thus keeping the overhead temperature below 150° C. During the reaction isobutyl alcohol principally distills off. The final product is 2-isopropenyl-4-methyl-4-butyloxazoline.

Similarly, in Example 12, upon substitution of ethyl acrylate by isobutyl methacrylate, there is obtained 2-isopropenyl-4-methyl-4-octyl-5,6-dihydro-4H-1,3-oxazine.

Instead of using tetraisopropyl titanate there can be used equally effective alkoxides of aluminum, alkoxides of gallium or zirconium in an amount from 5–20% based on the alkanolamine.

Equally good polymerization inhibition is obtained when there is used p-hydroxydiphenylamine, hydroquinone, or trinitrotoluene.

Example 13

There are heated together 129.2 g. or 1-amino-1-(α-hydroxymethyl)cyclohexane and 220 g. of methyl methacrylate containing about one gram of p-hydroxydiphenylamine under a column with 600 mm. pressure; six grams of tetraisopropyl titanate over a period of about four hours. The distillation takes place in eight hours and there is collected 60° of the theoretical methanol. Distillation of the residue gives a fraction which is 2'-isopropenyl-spiro[cyclohexane-1,4'-oxazoline], which has a boiling point of 62°–80° C. at 12 mm., the refractive index, $n_D^{25}$, is 1.485, neutralization equivalent 175.3, calculated 179.3. Infra-red examination shows the characteristic 2-band system at 1658 and 1613 cm.$^{-1}$. This compound may be made up in fungicidal compositions; it is useful in the preparation of polymers and copolymers, and it may be used as an agent for wool stabilization.

Example 14

Repetition of the above procedure with substitution of methyl methacrylate with methyl acrylate yields a fairly pure fraction of 2'-vinyl-spiro[cyclohexane-1,4'-oxazoline].

Example 15

143 g. of 1-amino-1-(β-hydroxyethyl-cyclohexane) and 220 g. of methyl methacrylate are reacted in a similar way yielding 2'-isopropenyl-spiro[cyclohexane-1,4'(5',6'-dihydro-4'H-1',3'-oxazine)] in fair purity.

2'-vinyl-spiro[cyclohexane-1,4'(5',6'-dihydro-4'H-1',3'-oxazine)] is obtained by replacing methyl methacrylate by methyl acrylate.

Example 16

2,5-diethyl-2'-isopropenyl-spiro[cyclohexane-1,4'(5',6'-dihydro-4'H-1',3'-oxazine)] is the product obtained from 1-amino-2,5-diethyl-1-(β-hydroxyethyl)cyclohexane by following the same general procedure.

2,5-diethyl-2'-vinyl-spiro[cyclohexane-1,4'(5',6'-dihydro-4'H-1',3'-oxazine)] is obtained where methyl acrylate is reacted with the same alkanolamine. These compounds are useful, for instance, in the classification of ores and as fungicides.

Example 17

2,4-diethyl-2'-isopropenyl-spiro[cyclohexane-1,4'-oxazoline] is a fairly pure product obtained by reacting 1-amino-2,4-diethyl-1-(α-hydroxymethyl)cyclohexane with methyl methacrylate by generally following the same method.

Substitution of methyl methacrylate by methyl acrylate gives 2,4-diethyl-2'-vinyl-spiro[cyclohexane-1,4'-oxazoline].

The monomers made from the compounds of this invention are useful chemical intermediates. They can be hydrolyzed with bases or acids giving, for example, hydroxyaminoethyl methacrylates or acrylates. The monomers can be quaternized by treatment with alkylating agents.

The monomers of this invention, especially those with higher $R^1$ or $R^2$ alkyl substituents, are very useful for the classification of ores. When dissolved in water they are effective flotation agents.

The new monomeric 4,4-dialkyl-2-vinyl and 4,4-dialkyl-2-isopropenyl substituted oxazolines, identically substituted 5,6-dihydro-4H-1,3-oxazines, and the spirans thereof are polymerizable alone or with one or more other polymerizable unsaturated compounds.

The polymerization is effected with the aid of a free-radical catalyst such as one or more azo-type catalysts. These are compounds in which —N=N— group is attached to aliphatic carbons at least one of which is a tertiary carbon atom. One of the carbon atoms bonded to the tertiary carbon atom has its remaining valences satisfied by at least one element from the class consisting of oxygen and nitrogen. Typical catalysts are azodiisobutyronitrile, azodiisobutyramide, dimethyl-, diethyl-, or dibutylazodiisobutyrate, azobis(α,γ-dimethylvaleronitrile), azobis-(α-methylbutyronitrile), azobis(α-methylvaleronitrile), dimethyl- or diethylazobismethylvalerate, and the like. One or a mixture of catalysts may be used in amounts of about 0.05% to 2% based on the weight of the monomer. Polymerization may be effected in bulk, in solution, or in emulsion. In the last case use of a redox system is very effective.

To effect polymerization, the monomers and the acyclic azo catalyst are mixed directly or in the presence of an inert solvent and the mixture is maintained between 0° and 100° C., a range of 40° to 80° C. being preferred, until the desired extent of polymerization is attained. The polymerization is best carried out in an inert atmosphere such as nitrogen gas.

For polymerization in solution concentrations of monomers from about 10% to 60% are generally desirable. The course of polymerization may be readily followed from the increase in viscosity of the solution. The catalyst may be added in increments, if desired, with or without additional solvent.

Copolymers are readily prepared from the oxazolines and 5,6-dihydro-4H-1,3-oxazines of this invention with other vinylidene compounds which are polymerizable with free-radical catalysts. While polymerizable monovinylidene compounds are preferred, there may also be used polyvinylidene compounds. Typical vinylidene compounds for copolymerization or interpolymerization include acrylic and methacrylic acids, their esters, amides, salts, nitriles, acrylonitrile, styrene, and their homologues and analogues. Specific vinylidene compounds are methyl, ethyl, isopropyl, butyl, tert-butyl, octyl, dodecyl, octadecyl, octenyl, or oleyl acrylates, or octyl, dodecyl, octadecyl, octenyl, or oleyl acrylates or methacrylates, tert-butylaminoethyl acrylate or methacrylate, dimethylaminopropyl acrylate or methacrylate, N-methylacrylamide, N-butylmethacrylamide, dimethylaminoethylacrylamide, dimethylaminopropylacrylamide, or the comparable acrylamides, α-methylstyrene, p-methylstyrene, p-chlorostyrene, vinylnaphthalene, and the like. When two or more free radical polymerizable vinylidene groups occur, as in divinylbenzene, ethylene diacrylate or methacrylate, in trivinylbenzene(bis-vinyloxyethyl)urea, or vinyloxyethyl acrylate or methacrylate, insoluble interpolymers result.

Interpolymerization may be effected in bulk, solution, emulsion, or in suspension. A wide range of compositions may be used. Copolymers are preferably constituted with 5% to 95% of one or more of the 2-vinyl and 2-isopropenyl substituted oxazolines and identically substituted oxazines and the spirans formed therefrom. Even proportions up to 99% can be used where a minor variation in the polymeric compounds of this invention is desired, while as little as 0.5% of these compounds in some cases influences the properties of a polymerizable vinylidene compound. Generally, 0.5 to 50% of the monomer of this invention is used to modify the nature of another kind of vinylidene polymer.

Copolymerization may be effectuated in the presence of azo catalysts described above or peroxidic catalysts. Typical organic peroxides useful as polymerization initiators are benzoyl peroxide, acetyl peroxide, capropyl peroxide, butyl perbenzoate butyl hydroperoxide, and the like. An amount of 0.1% to 50% of the weight of the monomeric starting materials may be used.

In emulsion or suspension polymerization, there may be used hydrogen peroxide, ammonium persulfate, sodium persulfate, potassium persulfate, or other inorganic peroxidic catalysts, preferably in a redox system to which a reducing substance, such as sodium sulfite, bisulfite, metabisulfite, or hydrosulfite is used with or without a metal activator. Regulators may also be used in emulsion, suspension or bulk polymerizations.

In polymerizations by the technique of dispersion or suspension a mixture of the monomers of this invention and another polymerizable vinylidene compound with or without an inorganic solvent is dispersed or suspended in water. An emulsifier and/or dispersing agent may be used. The mixture is customarily stirred. A polymerization catalyst is added and, if desired, modifiers, buffers, metal ions, mercaptans, and the like. Ordinarily, dispersions containing 10% to 60% polymerizable materials are used. Temperatures from 0° to 100° C. and preferably in the range of 15° to 60° C. are employed.

In bulk polymerization one or more monomers of this invention are mixed with one or more other polymerizable vinylidene compounds and a polymerization catalyst is added. The mixture is maintained at a temperature at which the catalyst is effective for promoting polymerization until reaction is essentially complete. The copolymerization is best carried out under an inert atmosphere.

The homopolymers of the lower molecular weight monomers of this invention possess the unexpected feature of being water-soluble in cold water but water-insoluble in hot water. This temperature inversion characteristic may be used advantageously in various applications where solubility at low temperatures in water is desirable. These homopolymers are substantially chemically stable in aqueous solutions under normal conditions of storage over long periods of time. In cold water the homopolymers give a weakly basic solution. They are also soluble in benzene and acetone.

Unexpectedly and surprisingly the homopolymers of this invention are useful as white retention agents for preventing the resettlement of dirt, and soil particles. Hence, the polymers may be used instead or in combination with washing promoters, such as the sodium salt of carboxymethylcellulose in anionic detergent compositions in small amounts, such as about 0.3 to 3.0% by weight of the total solids. The homopolymer, in addition to aiding in the elimination of soil redeposition, also contributes to the surface-active properties as evidenced by the formation foam in aqueous solutions. The type of anionic wetting agents that may be used in conjunction with the homopolymers are alkyl sulfonates and alkyl sulfate salts having alkyl chains of 8 to 20 carbon atoms. The alkyl sulfonates may be present in the range of 3% to 75% by weight of the total solids.

The polymers and copolymers of the compounds of this invention are useful in coating compositions, in textile finishing compositions, as adhesives, and as paper treating agents. They also are useful additives to viscose dopes and cellulose acetate dopes to improve the receptivity of the fibers to dyes. The polymers also tend to improve gas fading properties in textiles and fibers. Another surprising and unexpected property of the polymers is the fact that they impart antistatic characteristics to cloth.

The copolymers of this invention are useful for coating metals and rigid articles, in general, paper and textiles. For paper and textiles they may provide useful crease-proof coatings.

The copolymers formed, with about 0.1 to 20% of the monomers of this invention with 80 to about 98% acrylonitrile or with copolymers of acrylonitrile and other monomeric substances, have good fiber-forming qualities combined with improved dye receptive characteristics. The acrylonitrile polymers which may be used to form fibers may be polymers of monomeric composition of which acrylonitrile is at least 85% and preferably 90%, of the total monomeric components and of which from 0.1 to 15% of the total monomeric components is a monomer of this invention which contributes to this dye receptivity to the polymer. The relationship of the acrylonitrile and the monomers of this invention may be a conjoint polymerization product, or each of the critical monomers may be polymerized separately and the resultant polymers blended to form the dye-receptive fiber-forming composition.

The acrylonitrile copolymers are the copolymers of from 85 to 98% of acrylonitrile and from two to 15% of other monomeric components, for example vinyl acetate, styrene, vinyl chloride, vinylidene chloride, $\alpha$-methylstyrene, alkyl acrylates, alkyl methacrylates, alkyl fumarates, alkyl maleates, and methacrylonitrile.

The new blended compositions of the instant invention may be frabricated into synthetic fibers by the conventional wet or dry spinning procedures. The polymer may be dissolved in suitable solvents, for example, N,N-dimethylformamide, $\gamma$-butyrolactone, ethylene carbonate. The solution is spun and the fibers stretched to develop the necessary orientation and tensile strength and shrunk to improve thermal resistance.

The polymers of the compounds of this invention, upon copolymerization with polyvinylidene monomers, can be lightly cross-linked. As the reaction occurs the product becomes increasingly insoluble. They may be reacted with cellulose, silk, wool, and the like; these substances may be made water-repellent. The polymers may also be mixed with other coating materials. When the films formed from the mixture are heated, cross-linking coupled with solvent resistance is obtained.

When the monomers are copolymerized with other polyvinylidene compounds, such as with divinyl benzene, there are obtained novel and useful resins having weakly basic ion-exchange properties. Generally, there are employed from about 75 to 98% of the monomers, the remainder being a polyvinylidene compound. A suitable combination is 5% divinylbenzene and 95% of a monomer, such as 2-isopropenyl-4,4-dimethyloxazoline. Granulation of the resin yields materials suitable for use in conventional commercial column operations. The resins are hydrophobic and allow diffusion of ions through the structure at a finite and usable rate. By lightly cross-linking a resin of higher porosity, a resin of lower density and higher order of hydration is formed. Such resins have an advantageous higher rate of ionic diffusion, higher rate of exchange, and higher capacity for ions of high molecular weight. For example, they permit recovery and removal of high molecular weight ions that are too large to diffuse into the resin structures of the less porous and denser resins.

The polymers of this invention are useful to prepare quaternary ammonium type anion-exchange resins with alkyl halides. The quaternary salt is readily obtained by reacting the polymer with methyl iodide. In this manner, there may be prepared beads suitable for commercial column operations.

The polymers of this invention are useful to provide fungicidal compositions which have improved tenacity on plants. For this purpose, the polymers may be dissolved in an organic solvent miscible with water and the resulting solution extended with water to give a dispersion or there may be prepared emulsifiable concentrates.

The polymers of this invention and particularly those oxazolines and oxazines having higher alkyl substituents may be useful as improvers of the properties of liquid petroleum products. They may act as dispersants of gums, resins, asphaltenes, and sludge, which tend to form in lubricating oils as a result of incomplete combustion of fuel and decomposition of lubricants. The polymers also are useful as pour point depressors and viscosity index improvers. They become in general more effective on this account as the molecular weight of the copolymer increases. A type of polymer of interest for this type of application may be that of the monomers of this invention with alkyl acrylates and methacrylates having four to eighteen carbon atoms in the alkyl group thereof to provide the needed solubility in the oils to be improved.

In the following illustrative examples there is shown the preparation of polymers and copolymers of some of the 5,6-dihydro-4H-1,3-oxazines and oxazolines of this invention. All parts are by weight.

Example A

A portion of 100 parts of 2-isopropenyl-4,4-dimethyloxazoline is mixed with two parts of dimethyl azoisobutyrate as catalyst. The mixture is heated at 75° C. for 24 hours under a nitrogen atmosphere. A hard, clear polymer is obtained. The polymer dissolves in cold water and benzene. The dissolved polymer in benzene is poured into pentane. The product is dried at 60° C. at 0.5 mm. The white powder collected is white, hygroscopic polymeric material of the correct analysis. The polymer dissolved in benzene shows an azomethine peak at 1658 cm.$^{-1}$. The solution in water is weakly basic in alkacid test paper.

A solution of the polymer in methanol is useful as a coating composition for application to plastic coatings, such as those of poly(methyl methacrylate) to prevent surface marring and to decrease the build-up of static charges.

The polymer may be applied from aqueous methanol or acetone to Dacron, nylon, Orlon, or other synthetic filament and staple yarns as a warp-size. Such treatment reduces pilling and fuzz-balling.

A solution of the polymer in acetone containing 10% by volume of water may be added to acetone solutions of cellulose acetate in amounts of 1-25% or more by weight of polymer based on acetate and the mixture is then coagulated into films or fibers. The treated acetate has improved tensile strength and a favorable change in wet-tensile strength and dyeability.

The polymers may be used as thickening agents for alcohol, acetone, or mixture of water with these solvents.

In like manner, the following typical monomers are polymerized:

2-isopropenyl-4-methyl-4-octyloxazoline,
2-isopropenyl-4-methyl-4-(2′,3′-dimethyl)butyloxazoline,
2-vinyl-4,4-dimethyloxazoline,
2-vinyl-4-methyl-4-butyloxazoline,
2-vinyl-4-methyl-4-octyloxazoline,
2-isopropenyl-4,4-dimethyl-5,6-dihydro-4H-1,3-oxazine,
2 - isopropenyl-4-methyl-4-(3′-propyl)pentyl-5,6-dihydro-4H-1,3-oxazine,
2 - isopropenyl-4-methyl-4-octyl-5,6-dihydro - 4H-1,3-oxazine,
2-vinyl-4,4-dimethyl-5,6-dihydro-4H-1,3-oxazine,
2′-isopropenyl-spiro[cyclohexane-1,4′-oxazoline],
2′-vinyl-spiro[cyclohexane-1,4′-oxazoline],
2′-isopropenyl-spiro[cyclopentane-1,4-oxazoline],
2′ - isopropenyl - spiro[cyclohexane-1,4′-(5′,6′-dihydro-4′H-1′,3′-oxazine)],
2′ - vinyl - spiro[cyclohexane-1,4′-(5′,6′-dihydro - 4′H-1′,3′-oxazine)],
2,4-dimethyl-2′ - isopropenyl - spiro[cyclohexane - 1,4′-(5′,6′-dihydro-4′H-1′,3′-oxazine)], and
2,4 - dimethyl-2′-vinyl-spiro[cyclohexane - 1,4′-(5′,6′-dihydro-4′H-1′,3′-oxazine)].

The polymers are useful in the various applications described above.

Example B

A detergent composition is made up as follows with

| | Percent |
|---|---|
| Sodium dodecyl sulfate | 60 |
| Sodium pyrophosphate | 30 |
| Polymer of Example A | 6 |
| Sodium sulfate | 4 |

A washing solution was prepared and a standard soiled cotton cloth swatch was washed with it. The detergent composition is satisfactory in cleaning the cloth while showing a good degree of whiteness retention.

Other detergent compositions may be prepared with various other polymers of this invention such as with those of 2-isopropenyl-4-methyl-4-octyloxazoline,
2-vinyl-4,4-dimethyloxazoline,
2-vinyl-4-methyl-4-butyloxazoline,
2-vinyl-4-methyl-4-octyloxazoline,
2-isopropenyl-4,4-dimethyl-5,6-dihydro-4H-1,3-oxazine,
2-vinyl-4,4-dimethyl-5,6-dihydro-4H-1,3-oxazine,
2′-isopropenyl-spiro[cyclohexane-1,4′-oxazoline],
2′-vinyl-spiro[cyclohexane-1,4′-oxazoline], and
2′ - isopropenyl-spiro[cyclohexane - 1,4′-(5′,6′ - dihydro-4′H-1′,3′-oxazine)].

Example C

A solution is made up of ten parts of 2-isopropenyl-4,4-dimethyloxazoline, 90 parts of methyl methacrylate in toluene and 0.2 part of dimethyl azoisobutyrate. The mixture is blanketed with nitrogen and heated for four hours at 75° C. Ten parts of xylene are added and the solution is heated under reflux yielding a very viscous gum which, in xylene, gives a yellow solution of Gardner-Holdt viscosity of B. Films prepared by casting this solution on glass or metal and baked at 125° C. for thirty minutes were glossy, hard, and clear. When this solution is mixed with titanium dioxide, sprayed, and baked, it gives a glossy, white finish suited for refrigerators, washers, air-conditioners, and other coated metal appliances.

In lieu of methyl methacrylate, there may be satisfactorily used other esters of acrylic and methacrylic acid, such as ethyl, propyl, isopropyl, butyl, tert-butyl amyl, hexyl, octyl, nonyl, decyl, dodecyl, hexadecyl, octadecyl, cyclohexyl, benzyl, chlorobenzyl, and trichloroethyl.

A mixture of 50 parts of 2-isopropenyl-4,4-dimethyloxazoline, 2.5 parts of divinylbenzene and 0.5 part of azodiisobutyronitrile as catalyst is prepared. The monomers are mixed and the azo catalyst dissolved in the mixture in a small screw cap vial. The air is displaced by nitrogen and the mixture after heating for four hours at 75° C. resulted in a hard, brittle, translucent resin.

Another resin is prepared by suspension polymerization technique using brine as the suspending medium and a soluble polymeric quaternary resin as suspending agent. Beads of 20-50 mesh are obtained. Ion-exchange columns of this resin, suitable for treating water or other liquids, may be prepared.

Example D

About ten parts of resin and sixty parts of methyl iodide are refluxed together for ten hours. The product, after washing and drying, is analyzed and shows about 50% conversion to the quaternary type anion-exchange resin.

Example E

There are mixed ten parts of 2-isopropenyl-4,4-dimethyl-5,6-dihydro-4H-1,3-oxazine with 100 parts of acrylonitrile in the presence of dimethylazoisobutyrate, 0.1 part. The resulting polymers dissolved in water or alcohol are useful in the treatment of fabrics. Rayon material is padded through such a solution and the fabric is dried and cured at 280° F. for twelve minutes. The resulting material may now be laundered with less than 2% shrinkage and has a full somewhat crisp hand. Nylon and woolen materials may similarly be treated to give a durable, stiff finish.

In place of acrylonitrile there is used methyl, ethyl, or butyl, propyl, and tert-butyl methacrylate with formation in each case of a copolymer useful for coating. Also, in place of the above acrylonitrile there may be used mixtures of methyl methacrylate and ethyl, propyl, and butyl acrylate.

Example F

A copolymer of 8.5% 2-isopropenyl-4,4-dimethyloxazoline and 91.5% acrylonitrile are dissolved in dimethylacetamide to the extent of 17% solids. The resulting spinning solution is extruded through a spineret having thirty apertures, each 0.005 inch in diameter. The fiber is continuously washed in hot water, dried on steam-heated rolls, and steam stretched. The fiber produced is then dyed as skeins in Wool Fast Scarlet G Supra dye-bath of 2% and 10% concentrations (based on the fiber weight), each bath containing 10% sulfuric acid (based on fiber weight), by two hours at boiling. Satisfactory dye pickup occurred to yield deep shades of scarlet. Improvement in dyeability properties over fibers without 2-isopropenyl-4,4-dimethyloxazoline may be observed.

The same procedure is duplicated with the exception that the blend of the copolymer is 81.5% acrylonitrile, 10% vinyl acetate, and the remaining being 2-isopropenyl-4,4-dimethyloxazoline. Very satisfactory dye pickup is observed. An improvement in dyeability over a sample of 97% acrylonitrile and 10% vinyl acetate copolymer fiber may be noted.

A film of this copolymer prepared by casting from a 15% solution in dimethylformamide exhibited good dye receptivity to acid-type dyes in a dye bath have a pH of 3.0.

There may be substituted for 2-isopropenyl-4,4-dimethyloxazoline other monomers of this invention such as 2-isopropenyl-4-methyl-4-octyloxazoline,
2-vinyl-4,4-dimethyloxazoline,
2-vinyl-4-methyl-4-butyloxazoline,
2-vinyl-4-methyl-4-octyloxazoline,
2-isopropenyl-4,4-dimethyl-5,6-dihydro-4H-1,3-oxazine,
2-vinyl-4,4-dimethyl-5,6-dihydro-4H-1,3-oxazine,
2'-isopropenyl-spiro[cyclohexane-1,4'-oxazoline],
2'-vinyl-spiro[cyclohexane-1,4'-oxazoline],
2' - isopropenyl - spiro[cyclohexane - 1,4' - (5',6' - dihydro-4'H-1',3'-oxazine)], and
2' - vinyl - spiro[cyclohexane - 1,4' - (5',6'-dihydro - 4'H-1',3'-oxazine)].

We claim:

1. A composition of matter comprising a polymer of a monomer of the general formula

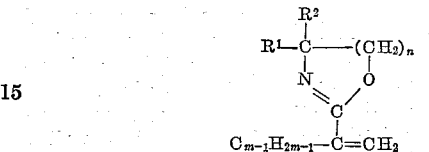

in which $R^1$ and $R^2$, when taken individually, are alkyl radicals one being methyl and the other containing from one to eight carbon atoms, $R^1$ and $R^2$, when taken together, form a divalent saturated aliphatic hydrocarbon group containing four to nine carbon atoms which together with the carbon atom unto which $R^1$ and $R^2$ are both bonded form a five- to six-sided carbocycle, $n$ is an integer from one to two inclusive, and $m$ is an integer from one to two inclusive.

2. A composition of matter comprising an addition polymer of a monomer defined in claim 1.

3. Polymer of 2-isopropenyl-4,4-dimethyloxazoline.

4. Polymer of 2 - isopropenyl - 4 - methyl - 4 - hexyloxazoline.

5. Polymer of 2-vinyl-4,4-dimethyloxazoline.

6. Polymer of 2-isopropenyl-4,4-dimethyl-5,6-dihydro-4H-1,3-oxazine.

7. A composition of matter comprising a copolymer of a monomer defined in claim 1 with another polymerizable vinylidene compound.

8. A composition of matter of claim 7 in which the vinylidene compound is a monovinylidene compound.

9. The composition of claim 8 in which the monovinylidene compound is acrylonitrile.

10. A composition of matter comprising a copolymer of a monomer defined in claim 1 and at least one acrylic ester, $RCOOCC(R^x)=CH_2$, where R is an alkyl group having from one to eighteen carbon atoms, and $R^x$ is a member of the class consisting of hydrogen and the methyl group.

References Cited in the file of this patent

UNITED STATES PATENTS 2,831,858     De Benneville et al. _____ Apr. 22, 1958

UNITED STATES PATENT OFFICE
Certificate of Correction

July 28, 1959

Patent No. 2,897,182

Peter L. de Benneville et al.

It is hereby certified that error appears in the printed specification of the above numbered patent requiring correction and that the said Letters Patent should read as corrected below.

Column 16, line 44, the formula should appear as shown below instead of as in the patent:

$$ROOCC(R^x)=CH_2$$

Signed and sealed this 10th day of May 1960.

[SEAL]

Attest:
KARL H. AXLINE,
*Attesting Officer.*

ROBERT C. WATSON,
*Commissioner of Patents.*